US012145435B2

United States Patent
Avadutala et al.

(10) Patent No.: US 12,145,435 B2
(45) Date of Patent: Nov. 19, 2024

(54) VEHICLE FUEL STORAGE MOUNTING SYSTEM

(71) Applicant: Nikola Corporation, Phoenix, AZ (US)

(72) Inventors: Vidya Sagar Avadutala, Tempe, AZ (US); Frederik Tjonneland, Gilbert, AZ (US); Jared Trauernicht, Litchfield Park, AZ (US)

(73) Assignee: Nikola Corporation, Phoenix, AZ (US)

( * ) Notice: Subject to any disclaimer, the term of this patent is extended or adjusted under 35 U.S.C. 154(b) by 21 days.

(21) Appl. No.: 18/319,307

(22) Filed: May 17, 2023

(65) Prior Publication Data

US 2024/0294064 A1    Sep. 5, 2024

Related U.S. Application Data

(60) Provisional application No. 63/487,670, filed on Mar. 1, 2023.

(51) Int. Cl.
    *B60K 15/067* (2006.01)
    *B60K 15/03* (2006.01)
    *B62D 21/02* (2006.01)

(52) U.S. Cl.
    CPC ............ *B60K 15/067* (2013.01); *B62D 21/02* (2013.01); *B60K 2015/03256* (2013.01)

(58) Field of Classification Search
    CPC ............... B60K 15/067; B60K 15/07; B60K 2015/03256; B60K 2015/0637; B60K 2015/03315; B60K 16/063; B60K 2015/03164; B62D 35/001; F17C 13/083; F17C 13/084; F17C 2205/0157

USPC ............................................. 280/384
See application file for complete search history.

(56) References Cited

U.S. PATENT DOCUMENTS

| | | | |
|---|---|---|---|
| 2014/0251479 A1 | 9/2014 | Gibb et al. | |
| 2018/0339594 A1 | 11/2018 | Brown et al. | |
| 2019/0047412 A1 | 2/2019 | Milton et al. | |
| 2019/0126744 A1 | 5/2019 | Sloan et al. | |
| 2019/0301682 A1* | 10/2019 | Sloan | F17C 13/083 |
| 2022/0274494 A1 | 9/2022 | McKibben et al. | |
| 2022/0396143 A1* | 12/2022 | Zhang | B60K 15/07 |
| 2024/0025246 A1* | 1/2024 | Gambone | B60K 15/063 |
| 2024/0174304 A1* | 5/2024 | Fan | B62D 33/06 |

FOREIGN PATENT DOCUMENTS

| | | |
|---|---|---|
| JP | 2003237389 A | 8/2003 |
| WO | 2023001743 A1 | 1/2023 |

OTHER PUBLICATIONS

USPTO; International Search Report and Written Opinion dated Jun. 5, 2024 in US Application No. PCT/US24/17790.

* cited by examiner

*Primary Examiner* — Anne Marie M Boehler
(74) *Attorney, Agent, or Firm* — Snell & Wilmer L.L.P.

(57) ABSTRACT

Components and systems for mounting fuel tanks to a vehicle and vehicle chassis are disclosed. An exemplary system includes a vertically oriented structure for mounting multiple fuel tanks to outboard brackets of a vehicle chassis. Via use of the system, improved vehicle mechanical characteristics and improved impact absorption are obtained.

10 Claims, 16 Drawing Sheets

VEHICLE FUEL STORAGE MOUNTING SYSTEM

CROSS-REFERENCE TO RELATED APPLICATION

This application claims priority to, and the benefit of, U.S. Provisional Patent Application No. 63/487,670 filed on Mar. 1, 2023 entitled "Vehicle Fuel Storage Mounting System." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates generally to mounting of fuel storage tanks and, more particularly, to systems and apparatus used to mount fuel storage tanks to vehicle chassis.

BACKGROUND

An assembly for mounting one or more fuel storage tanks, such as pressurized tanks for liquid or gaseous fuels, is desirably integrated into a vehicle in a manner that securely mounts the tanks to the vehicle chassis and is sufficiently strong to prevent excessive movement or displacement of the structure and tanks relative to the other systems of the vehicle. For example, it may be desirable to reduce or prevent excessive lateral, longitudinal, or flexing-type movement of the assembly relative to other components of the vehicle. Prior approaches suffer from various deficiencies; accordingly, improved systems and methods for coupling fuel tanks to vehicles and/or absorbing impacts in connection with such fuel tanks are desirable.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to "singular" includes plural embodiments, and any reference to "more than one" component or step may include a singular embodiment or step. Also, any reference to "attached," "fixed," "connected," or the like may include permanent, removable, temporary, partial, full or any other possible attachment option. Additionally, any reference to "without contact" (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

For the sake of brevity, conventional approaches for fuel storage tank mounting, retention, protection, use, and/or the like may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical system and/or related methods of use, for example an integrated fuel system associated with a fuel cell electric vehicle.

In connection with the present disclosure, the term "driver side" refers to the left side of a vehicle and "passenger side" refers to the right side of a vehicle when viewed from the rear of the vehicle. Further, the term "outboard" refers to a direction away from (i.e., outwardly) a center of a vehicle chassis or vehicle, and "inboard" refers to a direction towards (i.e., inwardly) a center of a vehicle chassis or vehicle.

Figure 1:
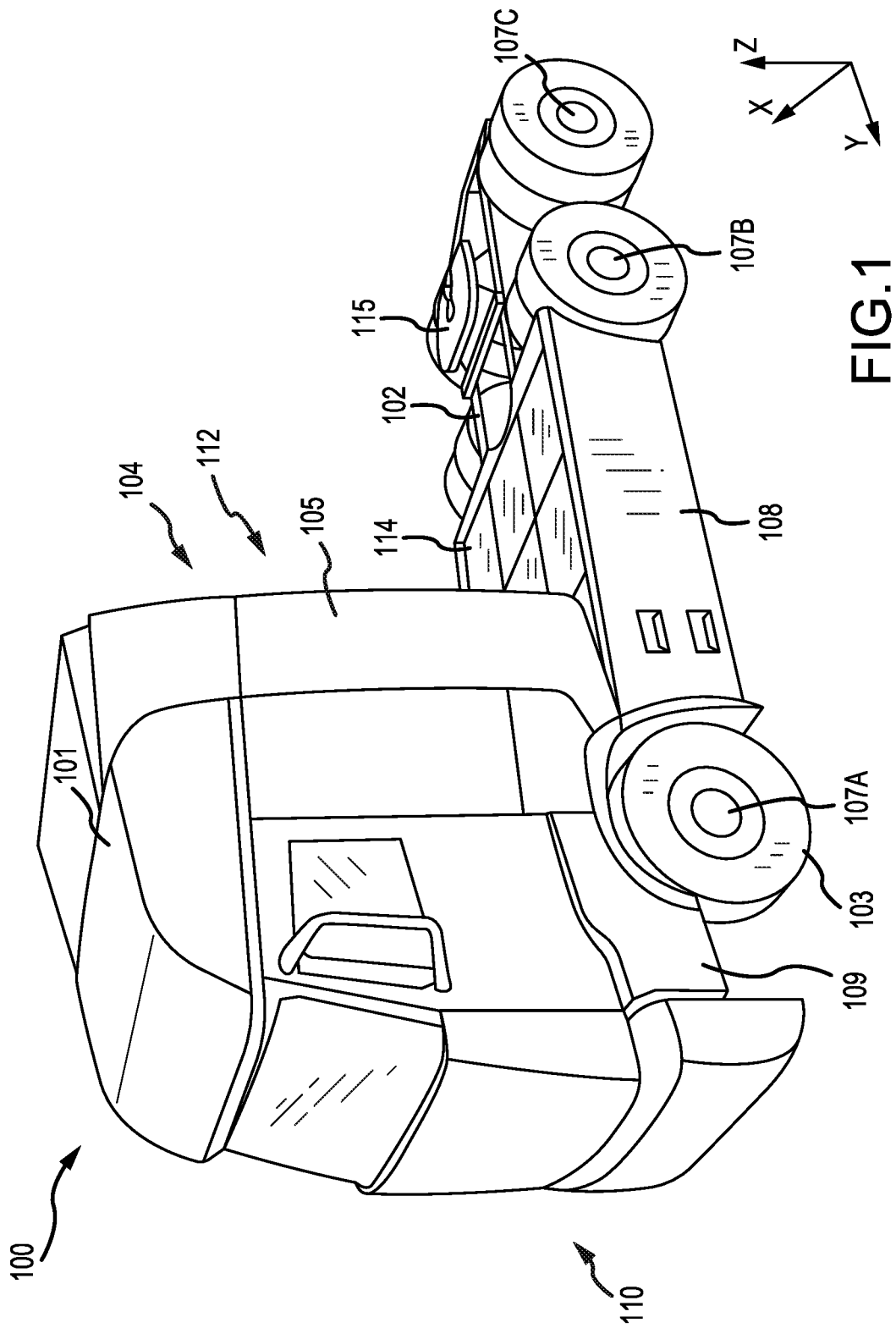
FIG. 1 illustrates a perspective view of a hydrogen electric commercial vehicle including a hydrogen tank mount assembly, in accordance with various embodiments.

With initial reference to FIG. 1, a vehicle 100 is illustrated, in accordance with various embodiments. In various embodiments, vehicle 100 is a hydrogen electric vehicle, and in certain embodiments, vehicle 100 is a heavy-duty hydrogen electric vehicle, such as a heavy-duty truck. Vehicle 100 may be a tractor unit which may tow a trailer unit configured to hold and transport cargo (also known as a "semi-truck"). Vehicle 100 may comprise a class 8, class 7, class 6, or any other weight classification of tractor-trailer combination. As described herein, vehicle 100 extends in a longitudinal direction along the Y-axis from a rear of vehicle 100 to a front of vehicle 100. Vehicle 100 extends in a lateral direction along the X-axis from a driver side of vehicle 100 to a passenger side of vehicle 100. Finally, vehicle 100 extends in a vertical direction along the Z-axis from a ground surface on which vehicle 100 drives to a top of vehicle 100.

Vehicle 100 comprises a cab 101 supported by a chassis 102. Cab 101 may be configured to shelter one or more vehicle operators or passengers from the external environment. In various embodiments, cab 101 comprises a door configured to allow ingress and egress into and from cab 101, one or more seats, a windshield, and numerous accessories configured to improve comfort for the operator and/or passenger(s). As illustrated in FIG. 1 vehicle 100 comprises a cab-over or cab-forward style tractor unit, but vehicle 100 is not limited in this regard and may comprise any style of tractor unit including a conventional or American cab-style tractor unit. Cab 101 may comprise a front end 110 and a rear end 112. In various embodiments, rear end 112 of cab 101 may further comprise a rear fairing 105. For example, rear fairing 105 may provide improved aerodynamics to cab 101 and/or provide structure and/or cover to additional components of vehicle 100. Additionally, vehicle 100 may be covered by one or more side covers 108 configured to provide corrosion-resistance and improved aerodynamics along the sides of vehicle 100.

Chassis 102, otherwise known as the vehicle frame, is configured to couple, secure, and support various components and systems of vehicle 100 including cab 101. Chassis 102 may comprise a ladder-like structure with various mounting points for the suspension, powertrain components, hydrogen storage system, and other systems of vehicle 100. As will be discussed in detail below, vehicle 100 may further comprise a fuel storage tank mount assembly 104. Fuel storage tank mount assembly 104 can comprise a structure configured to mount and support multiple fuel storage tanks to chassis 102. For example, fuel storage tank mount assembly 104 can be positioned at or near rear end 112 of cab 101. In various embodiments, at least a portion of fuel storage tank mount assembly 104 may be positioned at least partially within fairing 105 of cab 101. However, any positioning of fuel storage tank mount assembly 104 relative to cab 101 is within the scope of the present disclosure.

Vehicle 100 further comprises wheels 103 comprising one or more tires coupled to one or more axles 107 and configured to roll along a driving surface. In various embodiments, vehicle 100 comprises a pair of single wheels coupled to a front axle 107A and a pair of dual wheels coupled to two rear axles (first rear axle 107B and second rear axle 107C). One or more of the axles may be driven. For example, in various embodiments, vehicle 100 may comprise a 6×2 configuration with a single driven axle; however, vehicle 100 is not limited in this regard and may comprise a 4×2, 6×4, 6×6, or other suitable configuration. A trailer unit (not shown) may be coupled to electric vehicle 100, for example via a fifth-wheel coupling 115.

In various embodiments, vehicle 100 comprises one or more fuel cell stacks 109. Fuel cell stack(s) 109 convert gaseous or liquid fuel (such as hydrogen) to electrical energy. In various embodiments, fuel cell stack(s) 109 convert gaseous hydrogen stored within on-board hydrogen tanks into electrical energy that is supplied to one or more of an electrochemical storage device (e.g., a battery module or pack) and/or one or more electric motors. One or more fuel cell stacks 109 can be positioned, for example, within an engine compartment of cab 101 (where a diesel engine would be located in a conventional diesel truck). In other embodiments, fuel cell stack(s) 109 can be positioned behind cab 101, or in any other suitable location within vehicle 100.

Vehicle 100 can further comprise one or more electronic axles (e-axles). For example, one or more of front axle 107A, first rear axle 107B, and second rear axle 107C of electric vehicle 100 may comprise an e-axle which may include one or more electric motors, one or more gearboxes, and a differential configured to drive the wheels of electric vehicle 100.

Vehicle 100 may further comprise, for example, one or more high voltage battery packs 114. For example, battery pack 114 may be configured to receive electrical energy from fuel cell stack 109 and to provide electrical energy to one or more electric motors of e-axle 107B and/or 107C to drive vehicle 100. In various embodiments, direct current from battery pack(s) 114 may be converted to alternating current in one or more inverters and directed to the one or more electric motors in one or more e-axles 107B and/or 107C. However, in various embodiments, an electric motor may comprise an alternating current or direct current motor coupled to a wheel. Moreover, each e-axle may comprise a solid axle configuration or a split axle configuration.

In various embodiments, chassis 102 and components thereof may comprise any suitable high strength material capable of supporting the weight of vehicle 100 systems and components (for example, cab, suspension, hydrogen tanks, hydrogen fuel cell assemblies, and so forth) yet flexible enough to permit minor elastic deformation of chassis 102 as vehicle 100 travels and experiences stresses associated with normal operation. For example, in various embodiments, chassis 102 and components thereof may comprise a carbon steel, mild steel, cast iron, carbon fiber composite, magnesium alloy, aluminum alloy, titanium, nickel-based alloy, or any other suitable material or combinations thereof. Moreover, subcomponents of chassis 102 may be formed via any suitable fabrication technique including cutting, folding, welding, machining, punching, stamping, shearing, casting, additive manufacturing, or a combination thereof. Finally, subcomponents of chassis 102 may be coupled together utilizing any suitable technique including welding (using arc or gas welding), soldering, brazing, fastening (using rivets, screws, or nuts and bolts), press fitting, or by way of an adhesive.

Figure 2A:
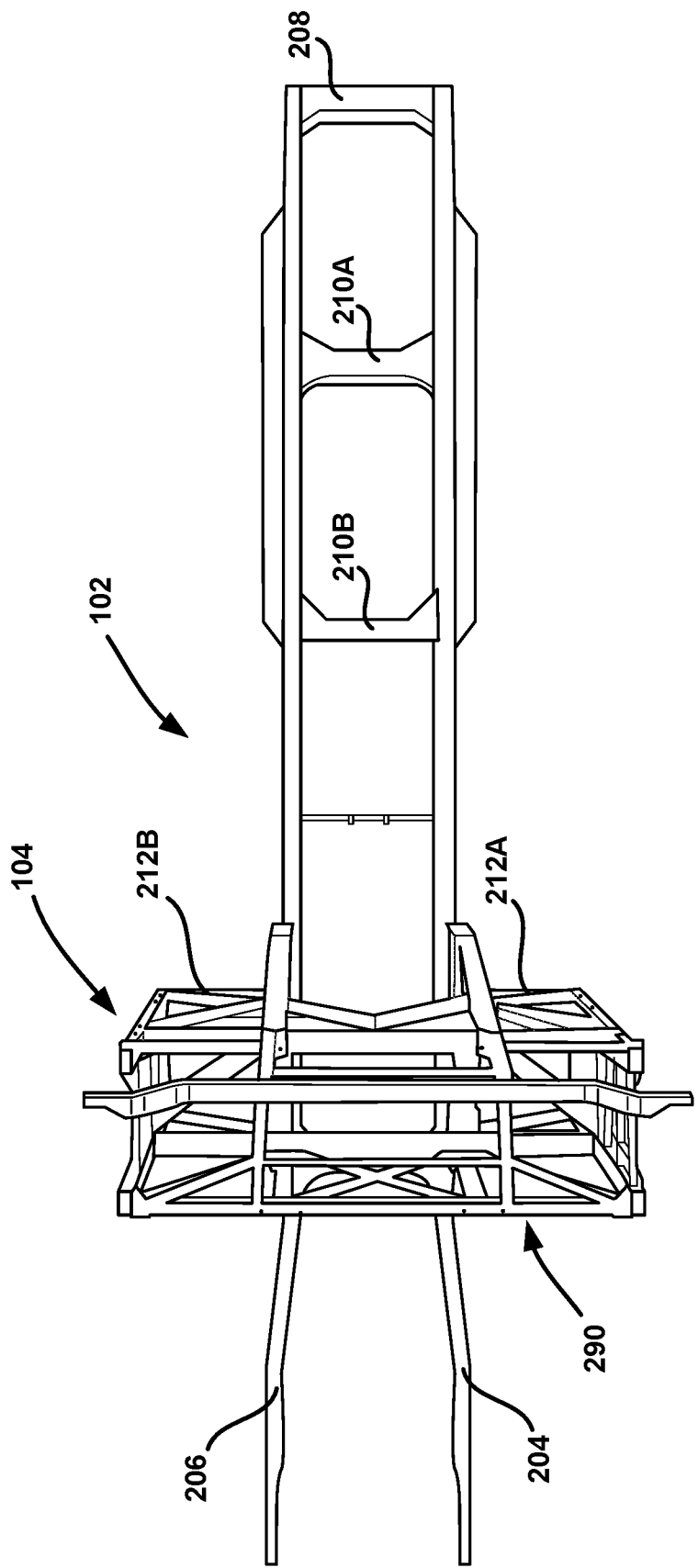
FIG. 2A illustrates a top view of a vehicle chassis with a fuel storage tank mount assembly, in accordance with various embodiments.
Figure 2B:
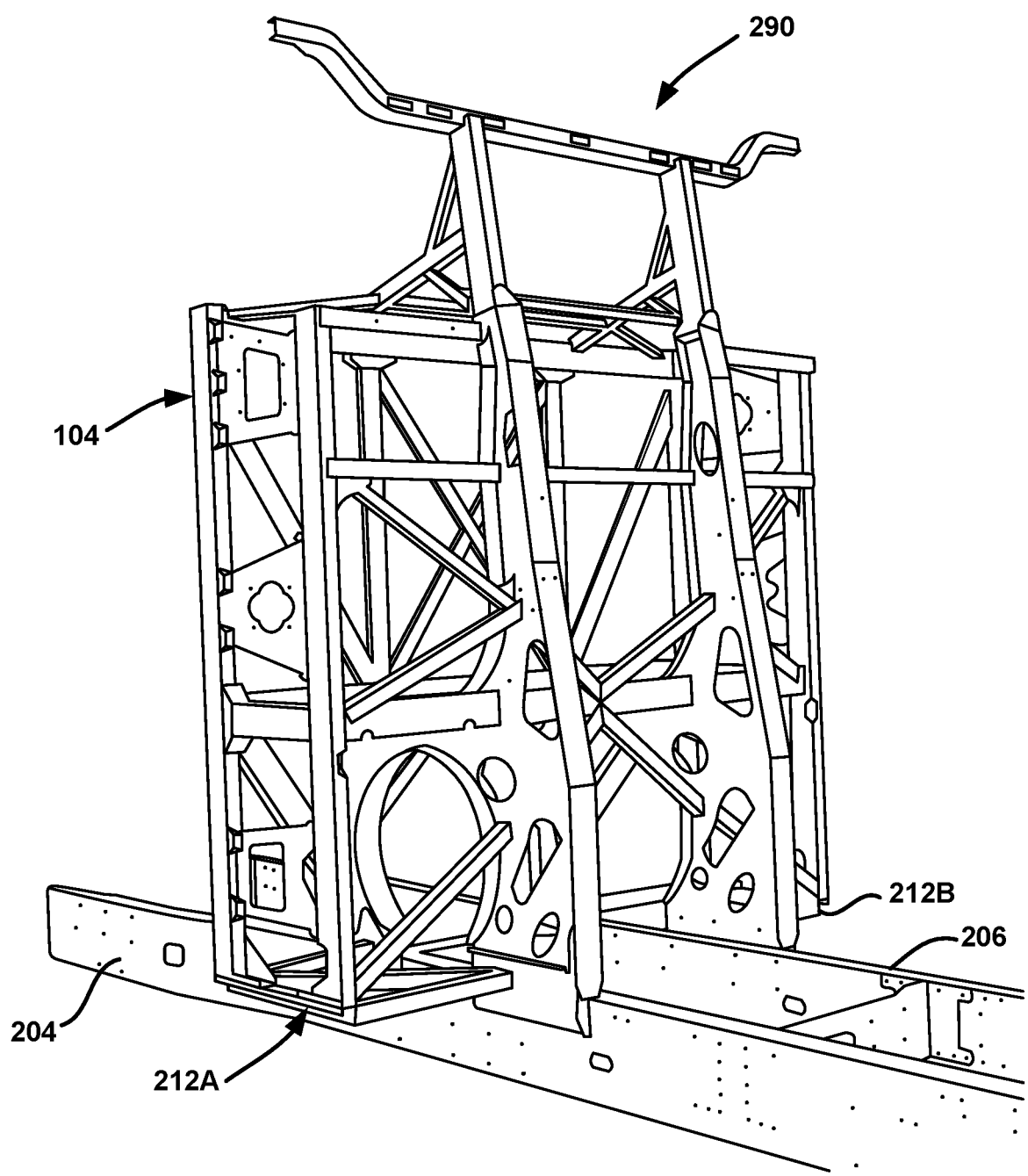
FIG. 2B illustrates a perspective view of the vehicle chassis and fuel storage tank mount assembly of FIG. 2A.
Figure 2C:
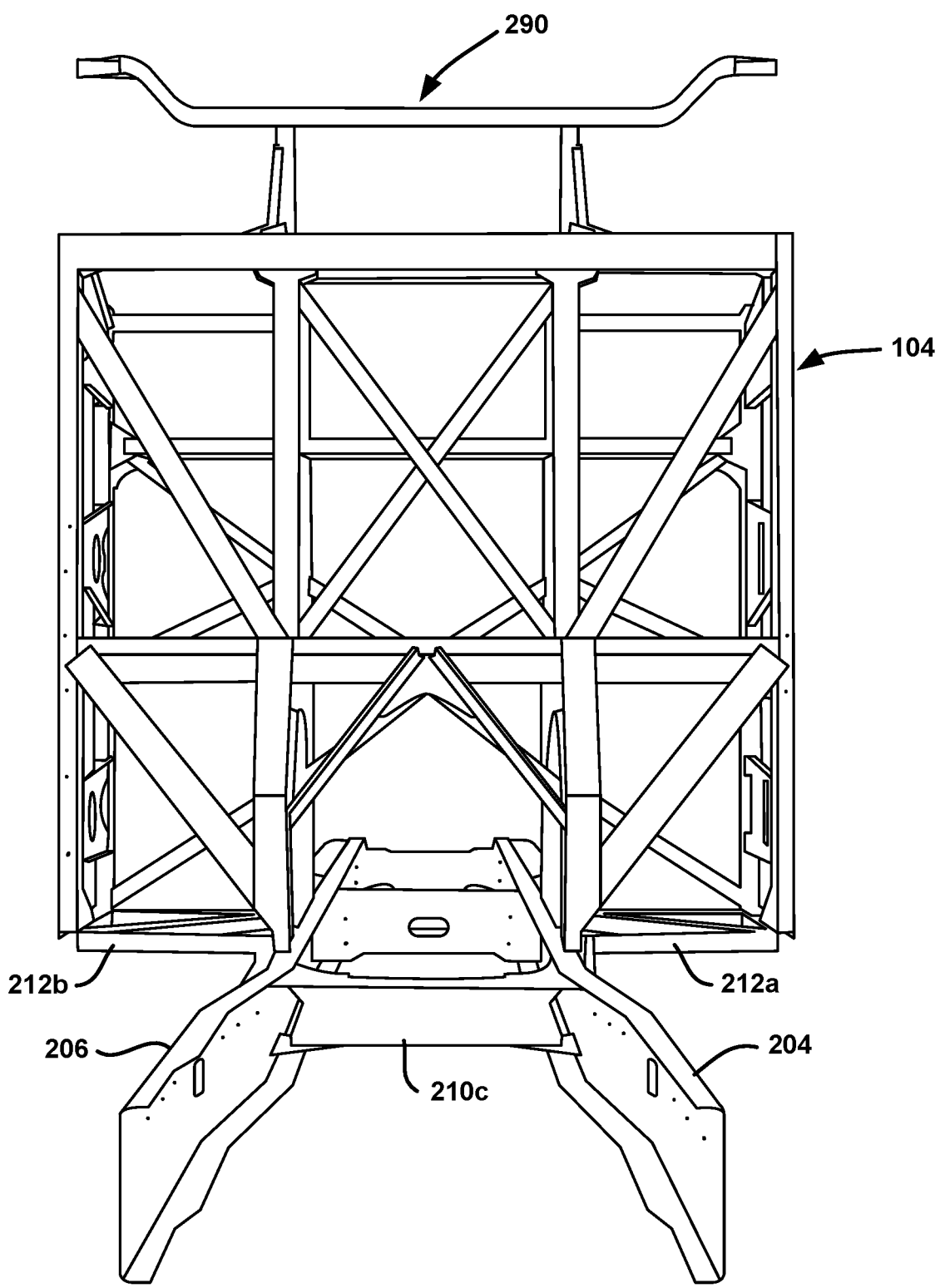
FIG. 2C illustrates a front view of the vehicle chassis and fuel storage tank mount assembly of FIG. 2A.

With reference to FIGS. 2A-2C, chassis 102 may comprise a "ladder frame" chassis comprising a pair of longitudinally extending side members interconnected by one or more transversely extending crossmembers. In various embodiments, chassis 102 comprises a first side member 204 and a second side member 206 opposite first side member 204. First side member 204 and second side member 206 may each comprise C-channels extending substantially parallel and extending across an entire or substantial portion (for example, about 80%, or more generally between about 75% and about 85%) of the longitudinal length of the vehicle 100. Each side member may be mirrored about a longitudinal centerline of the vehicle 100 such that upper and lower flanges of each side member extend transversely toward the other side member in a direction away from a web of each side member. While illustrated as comprising C-channels, first side member 204 and second side member 206 are not limited in this regard and may comprise members having any suitable cross-sectional geometry including hollow section, S-beams, W-beams, H-beams, I-beams, L-beams, or the like.

Chassis 102 further comprises one or more crossmembers configured to couple first side member 204 and second side member 206 substantially parallel to each other. The one or more crossmembers may be configured to resist compression and tension stresses in the transverse direction in addition to resisting torsion stresses. In various embodiments, chassis 102 may comprise an end crossmember 208 and one or more intermediate crossmembers 210. As illustrated in FIGS. 2A-2C, chassis 102 comprises an end crossmember 208 and three intermediate crossmembers 210A, 210B, and 210C; however, chassis 102 is not limited in this regard and may comprise any suitable number of transversely extending crossmembers. First intermediate crossmember 210A may be spaced apart from end crossmember 208 in a direction toward a front of vehicle 100. Similarly, second intermediate crossmember 210B may be spaced apart from first intermediate crossmember 210A in a direction toward a front of vehicle 100. In various embodiments, end crossmember 208, first intermediate crossmember 210A, and second intermediate crossmember 210B are spaced equidistantly; however, these components are not limited in this regard, and may be spaced unequally. Third intermediate crossmember 210C may be spaced apart from second intermediate crossmember 210B in a direction toward a front of vehicle 100. The distance between third intermediate crossmember 210C and second intermediate crossmember 210B may be greater than the distance between second intermediate crossmember 210B and first intermediate crossmember 210A and greater than the distance between first intermediate crossmember 210A and end crossmember 208. In various embodiments, the spacing and structure of end crossmember 208 and the three intermediate crossmembers 210A-C may be configured such that chassis 102 is configured with a substantially uniform stiffness/flexibility and strength along an entire longitudinal length of chassis 102 (or along a substantial portion thereof).

End crossmember 208, first intermediate crossmember 210A, second intermediate crossmember 210B, and third intermediate crossmember 210C may each comprise C-channels comprising an upper and lower flange spaced apart by a web which together define a channel. The flanges associated with each crossmember may generally be spaced apart in a vertical direction (along the Z-axis) and extend from the web in a longitudinal direction (along the Y-axis). End crossmember 208 and third intermediate crossmember 210C may be configured such that the flanges of these crossmembers extend away from the webs of the crossmembers in a direction toward the front of vehicle 100, while first intermediate crossmember 210A and second intermediate crossmember 210B may be configured such that the flanges of these crossmembers extend away from the webs of the crossmembers in a direction toward the rear of vehicle 100. End crossmember 208 and the three intermediate crossmembers 210A-C may be coupled to first side member 204 and second side member 206 via one or more plates, fasteners, or other suitable coupling mechanisms or components. Alternatively, the crossmembers may be formed integrally with first side member 204 and/or second side member 206.

In various embodiments, fuel storage tank mount assembly 104 is coupled to one or more of first side member 204 and second side member 206 of chassis 102. Fuel storage tank mount assembly 104 may, for example, couple to and support one or more fuel storage tanks positioned substantially horizontally and laterally relative to chassis 102. Multiple fuel storage tanks may be positioned within, coupled to, and secured by fuel storage tank mount assembly 104 at different vertical positions relative to first side member 204 and second side member 206. In various embodiments, three similar or identical fuel storage tanks may be secured to fuel storage tank mount assembly 104 in a horizontal orientation, substantially laterally to chassis 102 and substantially parallel to each other. However, fewer or more fuel storage tanks may be secured by fuel storage tank mount assembly 104.

In various embodiments, fuel storage tank mount assembly 104 is substantially perpendicular to first side member 204 and second side member 206. For example, fuel storage tank mount assembly 104 may extend outwardly from first side member 204 and second side member 206. Stated another way, fuel storage tank mount assembly 104 is positioned laterally across first side member 204 and second side member 206.

Fuel storage tank mount assembly 104 may be further secured to chassis 102 by lateral brackets, such as a first lateral bracket 212A and a second lateral bracket 212B. In various embodiments, first lateral bracket 212A couples to first side member 204 and fuel storage tank mount assembly 104 and second lateral bracket 212B couples to second side member 206 and fuel storage tank mount assembly 104.

In various embodiments, fuel storage tank mount assembly 104 further comprises a subassembly 290. Subassembly 290 may be positioned at a relatively higher vertical position than first side member 204 and second side member 206. In various embodiments, subassembly 290 is disposed generally at and comprises the highest vertical point, or top, of fuel storage tank mount assembly 104. Subassembly 290 may couple to and provide support for other components or assemblies of vehicle 100, including radiators, air intake plenums, fans, or other components. Such components may be related to the one or more fuel storage tanks positioned within fuel storage tank mount assembly 104 or may be related to other systems or components of vehicle 100.

With reference to FIGS. 3A-3F, in various embodiments, fuel storage tank mount assembly 104 comprises a pair of vertical supports. For the sake of clarity, numerous elements, including vertical supports, will be described with reference to their position on vehicle 100 relative to the driver side (denoted by the element letter "A") or the passenger side (denoted by the element letter "B"). In many instances, elements having the designation of driver side ("A") or passenger side ("B") may be identical or mirror images of each other. In the following embodiments, the elements of an exemplary fuel storage tank mount assembly 104 will be described with reference to the driver side ("A"), and FIGS. 3A-3F illustrate both the driver side ("A") and passenger side ("B") elements. More generally, elements in the Figures having a label of "B" but not discussed in further detail herein may be understood by referring to the corresponding "A" element (for example, element 334B of FIG. 3A may be understood in connection with the discussion of element 334A, element 430B of FIG. 4B may be understood in connection with the discussion of element 430A, and so forth).

In various embodiments, fuel storage tank mount assembly 104 may comprise a front vertical support 318A coupled to a rear vertical support 320A. Front vertical support 318A and rear vertical support 320A may be positioned proximate to and in contact with first side member 204. As will be described in greater detail, front vertical support 318A and rear vertical support 320A may provide central support for fuel storage tank mount assembly 104 and transfer weight from and forces acting upon fuel storage tank mount assembly 104 to chassis 102 via first side member 204 and second side member 206.

Front vertical support 318A and front vertical support 318B may, for example, be coupled and oriented relative to each other by one or more lateral members and/or cross members. With specific reference to FIGS. 3A and 3C, front middle inside lateral member 362 may couple and orient front vertical supports 318A and 318B relative to each other. Further, front vertical supports 318A and 318B may be further coupled and oriented relative to each other by front lower inside cross members 338A and 338B.

In various embodiments, rear vertical support 320A and rear vertical support 320B may be coupled to and oriented relative to each other by one or more lateral members and/or cross members. With specific reference to FIGS. 3B and 3D, rear middle inside lateral member 368 may couple and orient rear vertical supports 320A and 320B relative to each other. Further, rear vertical supports 320A and 320B may be further coupled and oriented relative to each other by rear upper inside cross members 366A and 366B and/or rear lower inside cross members 356A and 356B.

Fuel storage tank mount assembly 104 may further comprise a front outside vertical member 306A and a rear outside vertical member 308A. In various embodiments, outside vertical members 306A and 308A may be designed to resist compressive and expansive forces applied to fuel storage tank mount assembly 104. For example, outside vertical members 306A and 308A may comprise tubes, such as rectangular or cylindrical tubes, which provide sufficient strength in compression and expansion, which may assist in transmitting force from fuel storage tank mount assembly 104 to chassis 102. In various embodiments, tubular front outside vertical member 306A and/or rear outside vertical member 308A may provide for a lighter weight structure of fuel storage tank mount assembly 104, while providing the same or improved resistance to compressive and expansive forces than that provided by conventional fuel storage tank mount assemblies. Such improved resistance to compressive and expansive forces may allow for a higher modal frequency in the X, Y, and/or Z axes, as compared to conventional fuel storage tank mount assemblies.

In various embodiments, front outside vertical member 306A and rear outside vertical member 308A may each be oriented vertically in an outboard position relative to their respective front vertical support 318A and rear vertical support 320A.

Outside vertical members 306A and 308A may be coupled to and spaced apart from each other by one or more tank support brackets. In various embodiments, an end of a fuel storage tank may be removably coupled to a bracket 350, for example a bracket 350A (at one end of the fuel tank, for example, a valve end) and a bracket 350B (at the other end of the fuel tank, for example, a plug end) to secure the fuel tank to vehicle 100. For example, one or more brackets 350A may be positioned between and coupled to outside vertical members 306A and 308A, each securing one or more fuel tanks to fuel storage tank mount assembly 104 and, therefore, vehicle 100. Further, one or more brackets 350B may be positioned between and coupled to outside vertical members 306A and 308A, each securing an opposite end of a fuel tank to fuel storage tank mount assembly 104. Any combination of brackets 350A and 350B is within the scope of the present disclosure.

In various embodiments, outside vertical members 306A and 308A are coupled to and spaced apart from each other by one or more side longitudinal members 322A. For example, with specific reference to FIGS. 3C, 3E, and 3F, outside vertical members 306A and 308A may be coupled to and spaced apart from each other by a combination of one or more brackets 350A and side longitudinal members 322A.

Figure 3A:
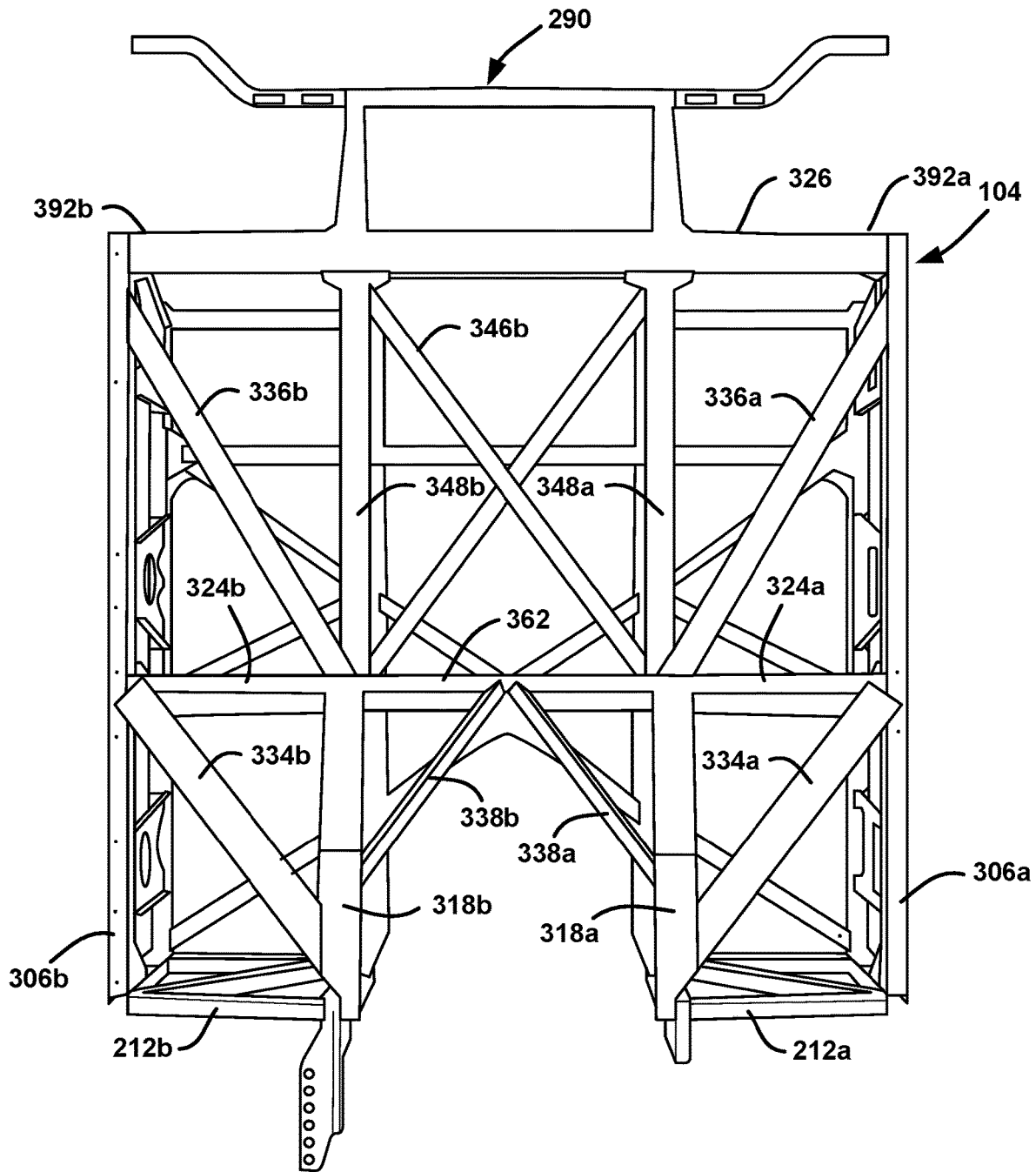
FIG. 3A illustrates a front view of a fuel storage tank mount assembly, in accordance with various embodiments.
Figure 3B:
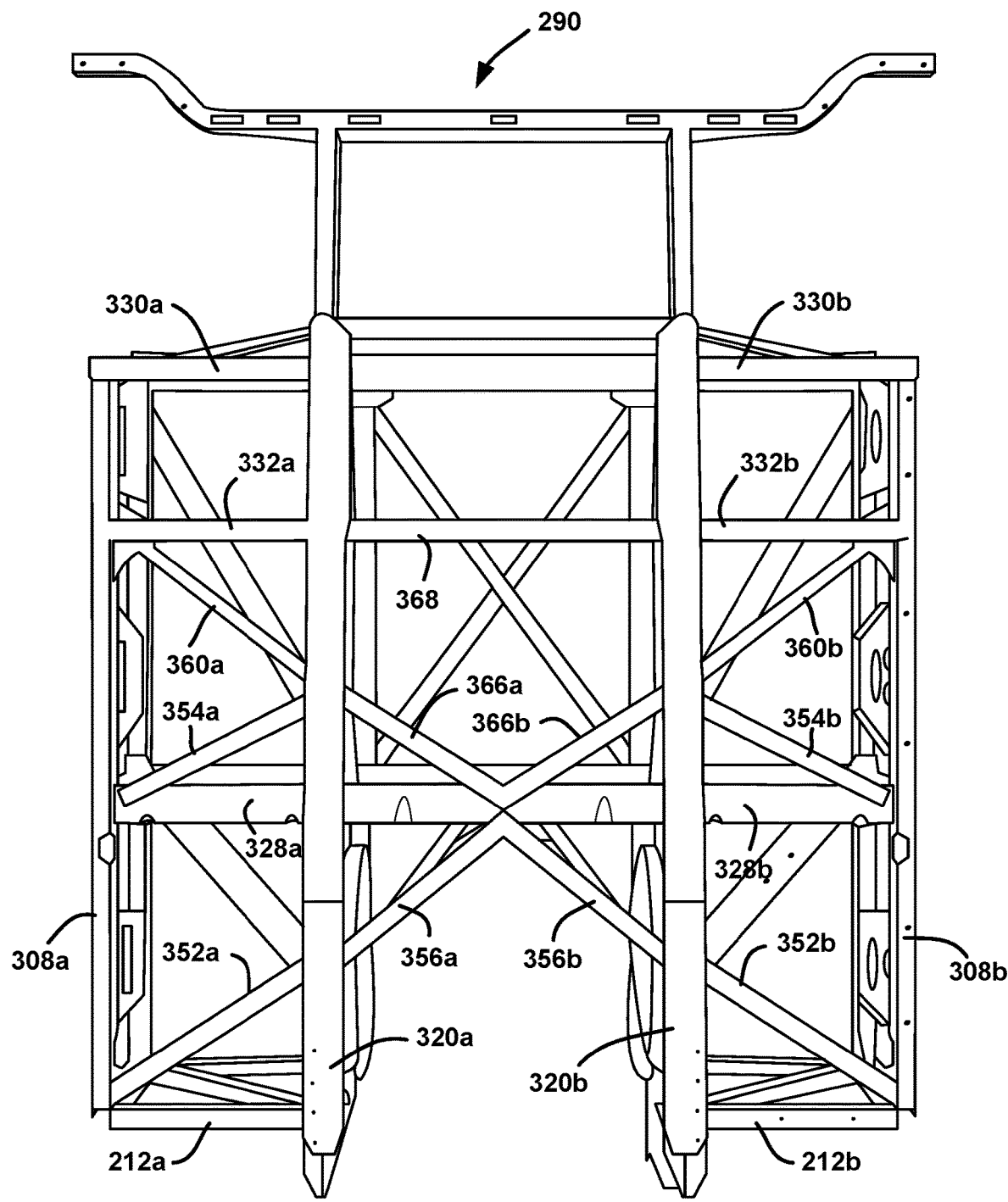
FIG. 3B illustrates a rear view of a fuel storage tank mount assembly, in accordance with various embodiments.
Figure 3C:
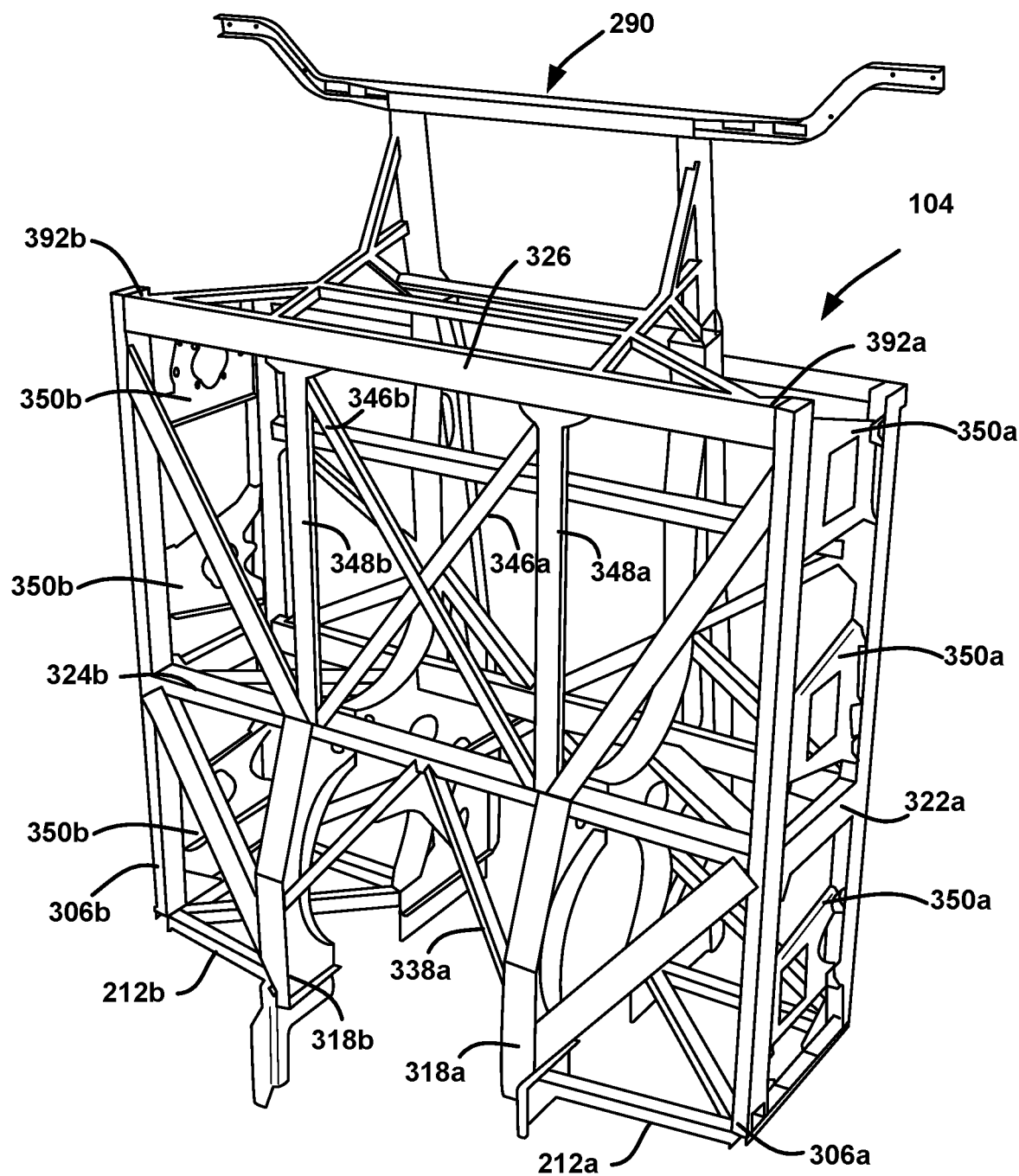
FIG. 3C illustrates a front perspective view of a fuel storage tank mount assembly, in accordance with various embodiments.
Figure 3D:
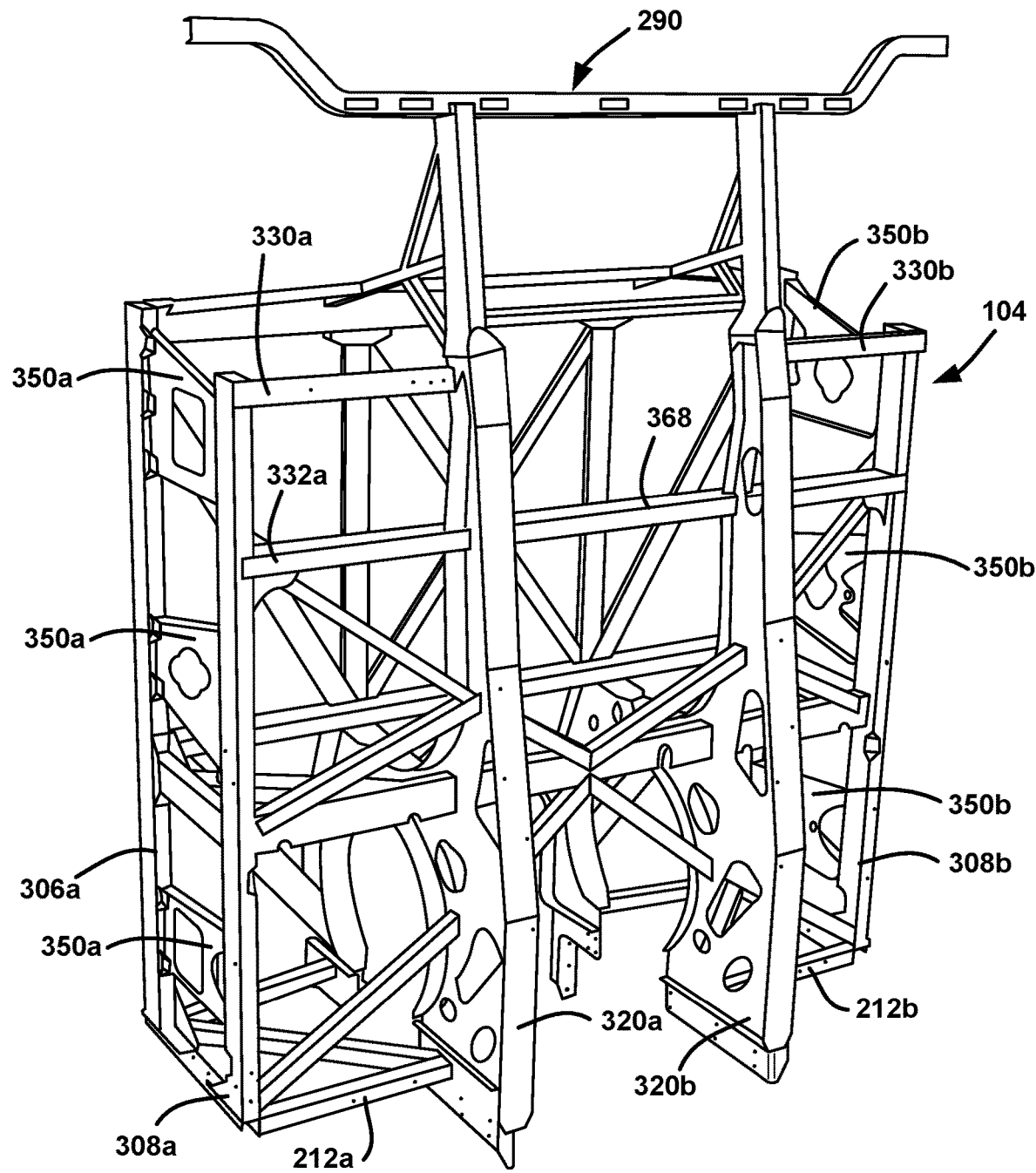
FIG. 3D illustrates a rear perspective view of a fuel storage tank mount assembly, in accordance with various embodiments.
Figure 3E:
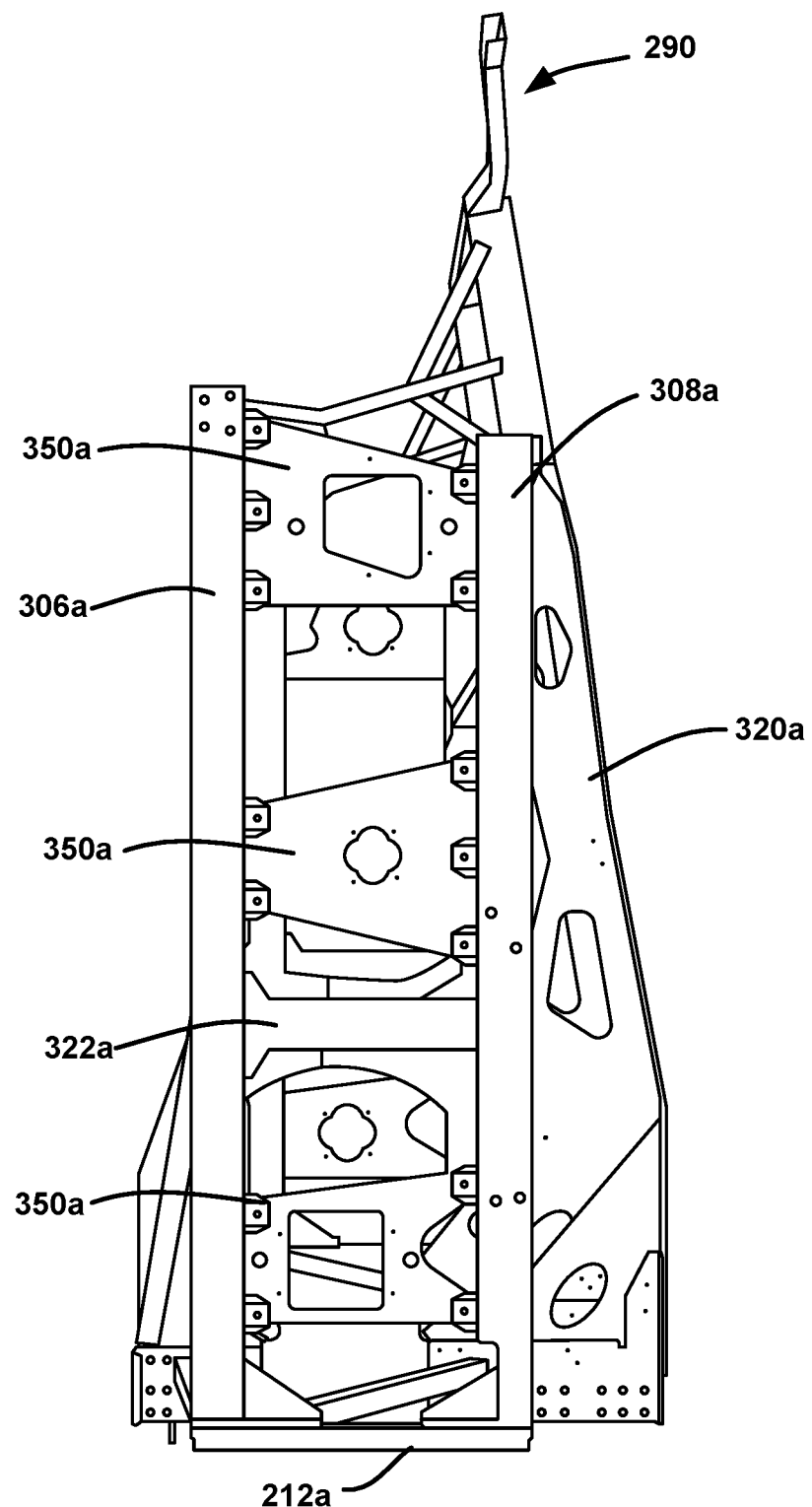
FIG. 3E illustrates a side view of a fuel storage tank mount assembly, in accordance with various embodiments.
Figure 3F:
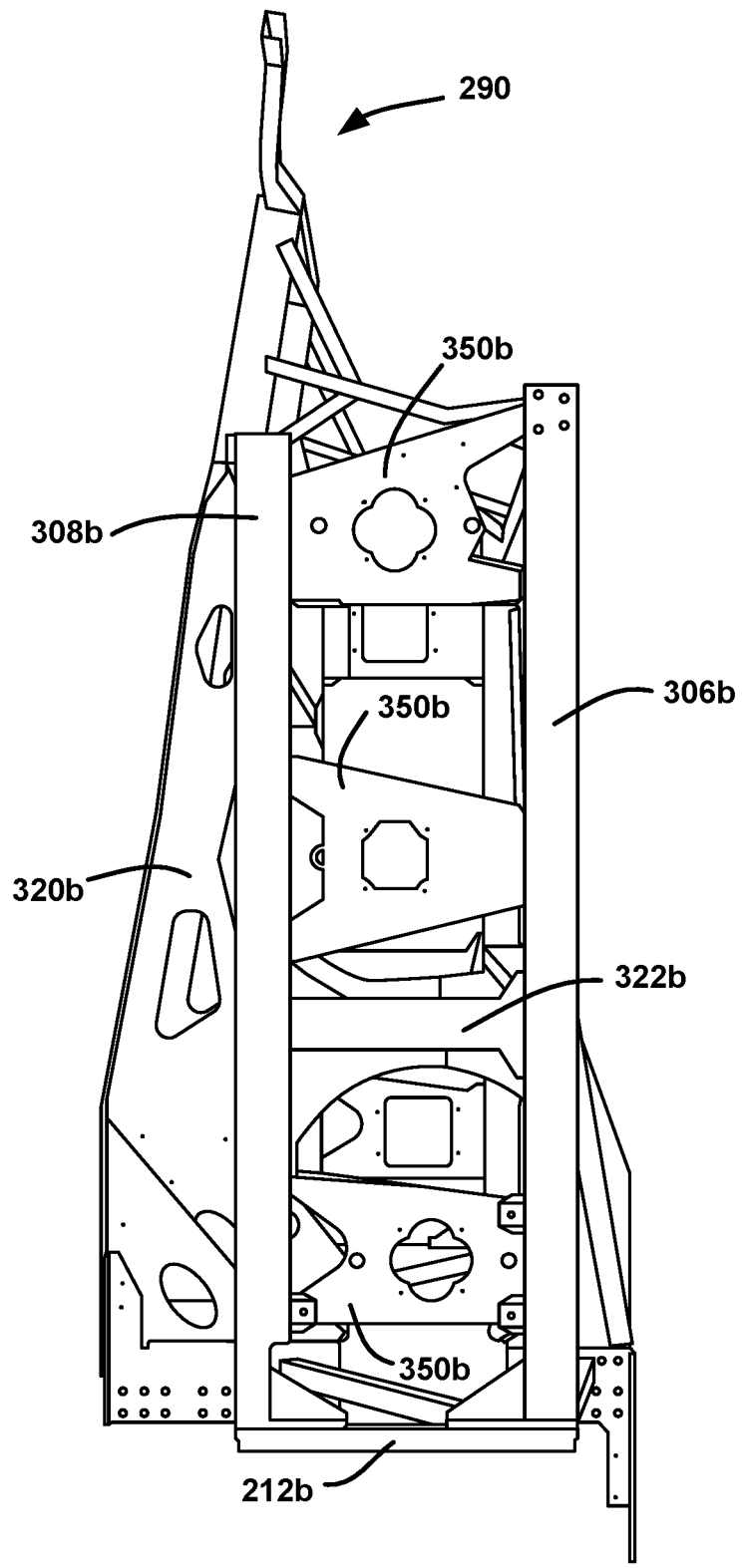
FIG. 3F illustrates another side view of a fuel storage tank mount assembly, in accordance with various embodiments.

With specific reference to FIGS. 3B and 3D, rear vertical support 320A and rear outside vertical member 308A may be coupled to and spaced apart from each other. In various embodiments, rear vertical support 320A and rear outside vertical member 308A are coupled to and spaced apart from each other by a rear middle outside lateral member 328A. For example, rear middle outside lateral member 328A may be positioned relatively perpendicular to and extend laterally between rear vertical support 320A and rear outside vertical member 308A at a vertical position between subassembly 290 and first lateral bracket 212A. Further, rear middle outside lateral member 328A may assist in providing proper relative positioning of rear vertical support 320A and rear outside vertical member 308A.

In various embodiments, rear vertical support 320A and rear outside vertical member 308A are further coupled to and spaced apart from each other by one or more cross members. One or more cross members may be oriented diagonally between rear vertical support 320A and rear outside vertical member 308A. For example, cross members 352A, 354A, and/or 360A may couple and orient rear vertical support 320A and rear outside vertical member 308A relative to each other. Further, rear vertical support 320A may be further coupled to and spaced apart from rear outside vertical member 308A by rear upper lateral member 330A and/or rear intermediate lateral member 332A.

With specific reference to FIGS. 3A and 3C, front vertical support 318A and front vertical member 306A may be coupled to and spaced apart from each other. In various embodiments, front vertical support 318A and front vertical member 306A are coupled to and spaced apart from each other by a front middle outside lateral member 324A. For example, front middle outside lateral member 324A may be positioned relatively perpendicular to and extend laterally to front vertical support 318A and front vertical member 306A at a vertical position between subassembly 290 and first lateral bracket 212A. Further, front middle outside lateral member 324A may assist in providing proper relative positioning of front vertical support 318A and front vertical member 306A.

In various embodiments, front vertical support 318A and front vertical member 306A are coupled to and spaced apart from each other by one or more cross members. One or more cross members may be oriented diagonally between front vertical support 318A and front vertical member 306A. For example, cross members 334A and 336A may couple and orient front vertical support 318A and front vertical member 306A relative to each other.

Front vertical members 306A and 306B may be coupled and secured to each other by one or more longitudinal members. For example, upper front lateral member 326 may be coupled at or near an upper end of front vertical members 306A and 306B to secure and orient front vertical members 306A and 306B to each other and/or a portion of subassembly 290. In various embodiments, upper front lateral member 326 comprises a first bracket 392A positioned proximate outboard the driver side end and a second bracket 392B positioned proximate outboard the passenger side end of upper front lateral member 326. In various embodiments, first bracket 392A may be secured to first outside vertical member 306A and second bracket 392B may be secured to second outside vertical member 306B.

In various embodiments, front middle outside lateral members 324A and 324B may be coupled and secured to upper front lateral member 326 by front upper inside cross members 346A and 346B and/or front middle vertical members 348A and 348B.

Figure 4A:
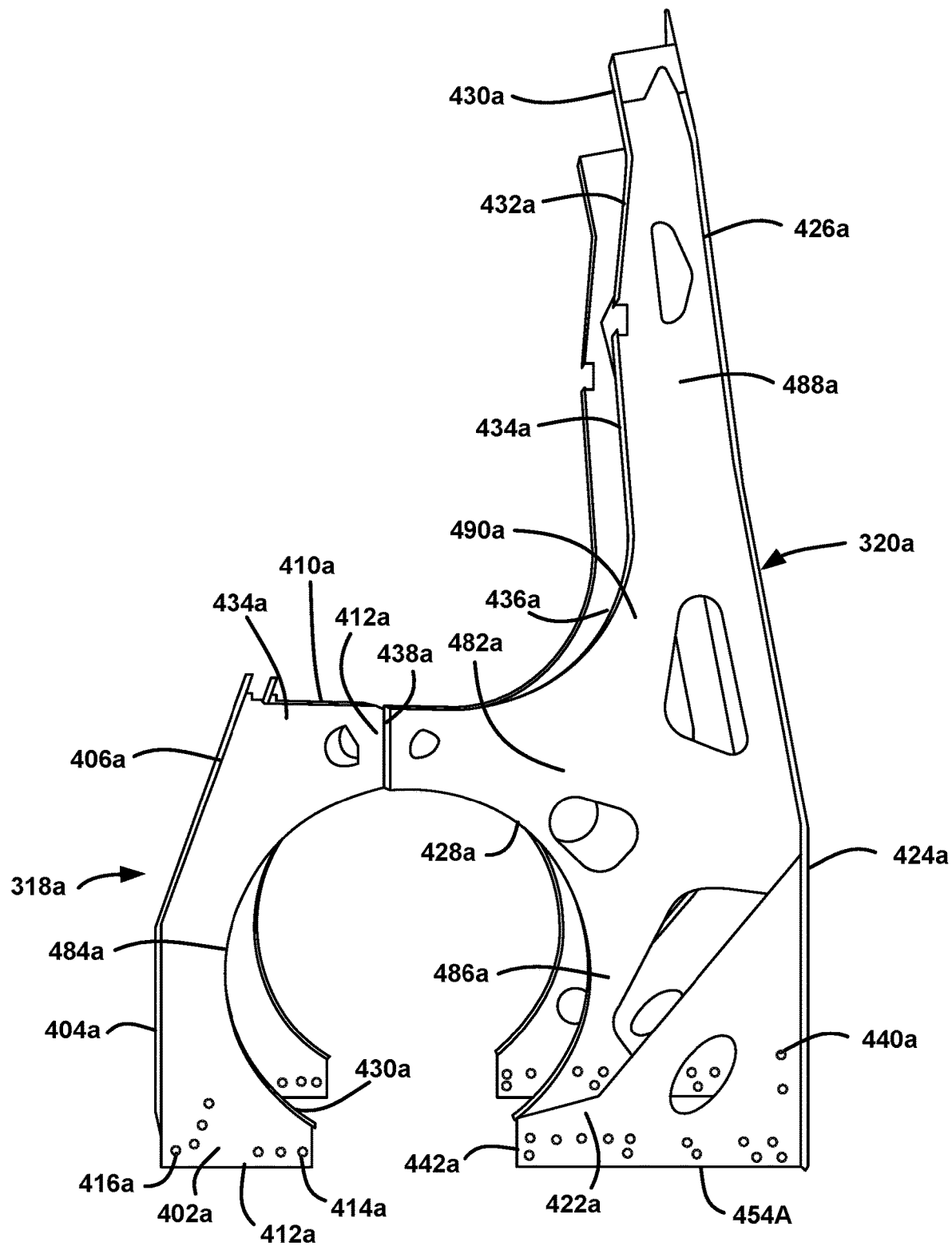
FIG. 4A illustrates a side view of a portion of a fuel storage tank mount assembly, in accordance with various embodiments.
Figure 4B:
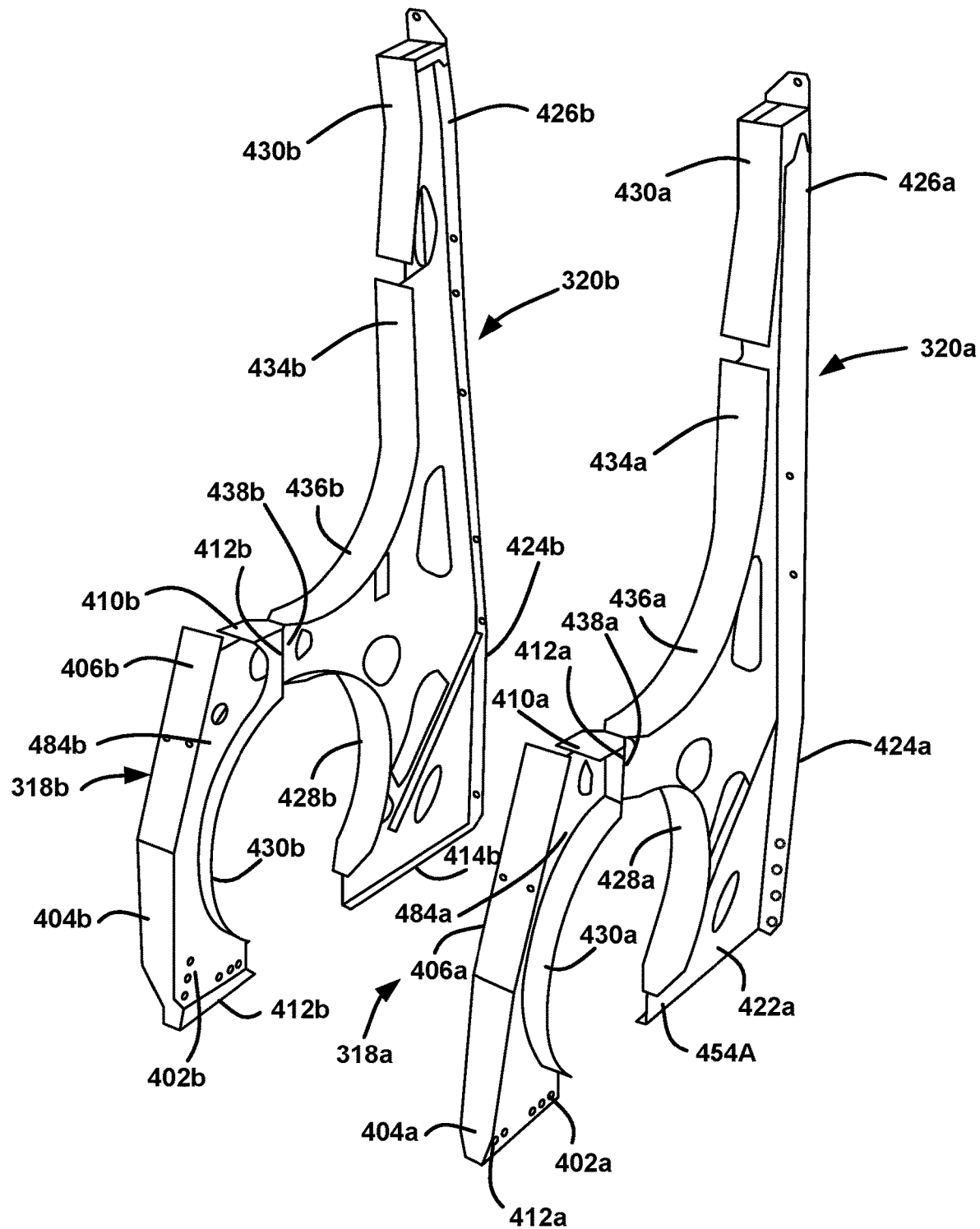
FIG. 4B illustrates a front perspective view of a portion of a fuel storage tank mount assembly, in accordance with various embodiments.

With initial reference to FIGS. 4A and 4B, front vertical supports 318A and 318B and rear vertical supports 320A and 320B of fuel storage tank mount assembly 104 are illustrated with additional components of fuel storage tank mount assembly 104 removed for clarity. In various embodiments, front vertical support 318A is coupled to rear vertical support 320A and positioned substantially parallel and adjacent to first side member 204 of chassis 102. Similarly, front vertical support 318B may be coupled to rear vertical support 320B and positioned substantially parallel and adjacent to second side member 206 of chassis 102. For the sake of brevity, the following disclosure will be directed to the aspects and elements of the driver side ("A") front vertical support 318A and rear vertical support 320A. However, the aspects and elements of the passenger side ("B") front vertical support 318B and rear vertical support 320B may be similar, identical, or a mirror image of the driver side.

In various embodiments, front vertical support 318A extends vertically from first side member 204 and is oriented generally longitudinally along chassis 102. For example, front vertical support 318A may extend vertically along a distance comprising only a portion of the total height of fuel storage tank mount assembly 104.

Front vertical support 318A may comprise, for example, a face 402A with one or more flanges positioned at an edge of and generally perpendicular to face 402A. In various embodiments, face 402A is coupled to a front bottom flange 412A that may be positioned adjacent and/or engaged with first side member 204.

In various embodiments, face 402A comprises a lower front curved portion 484A. For example, lower front curved portion 484A may comprise a curved portion facing towards rear vertical support 320A and partially surrounding a fuel storage tank. A front lower curved flange 430A may be coupled to lower front curved portion 484A. In various embodiments, front lower curved flange 430A may provide additional strength and/or stiffening to face 402A, and by extension, front vertical support 318A.

Face 402A may further comprise a first front flange 404A. In various embodiments, first front flange 404A is oriented substantially vertically, and may be the front-most portion of front vertical support 318A. Further, face 402A may comprise an upper portion 434A. In various embodiments, upper portion 434A of face 402A comprises a second, partially angled front flange 406A positioned along at least a portion of the forward-most edge of upper portion 434A. Face 402A may further comprise an upper flange 410A positioned along at least a portion of the upper edge of upper portion 434A and oriented substantially horizontally.

In various embodiments, face 402A further comprises a coupling flange 412A. Coupling flange 412A may be positioned within upper portion 434A of face 402A at a vertical height above first side member 204 and have a shape and configuration complementary to a flange of rear vertical support 320A.

Face 402A may comprise a plurality of mounting holes, in various positions, configured to couple front vertical support 318A to first lateral bracket 212A. For example, holes 416A may align with corresponding holes in a portion of first lateral bracket 212A, and holes 414A may align with corresponding holes in a different portion of first lateral bracket 212A. Fasteners may be passed through holes 414A and 416A to couple front vertical support 318A to first lateral bracket 212A.

In various embodiments, similar to front vertical support 318A, rear vertical support 320A extends vertically from first side member 204 and is oriented generally longitudinally along chassis 102. For example, rear vertical support 320A may extend a portion of the height of fuel storage tank mount assembly 104.

Rear vertical support 320A may comprise, for example, a face 422A with one or more flanges positioned at various edges of and generally perpendicular to face 422A. In various embodiments, face 422A is coupled to a rear bottom flange 454A that may be positioned adjacent and/or engaged with first side member 204.

In various embodiments, face 422A comprises a lower rear curved portion 486A. For example, lower rear curved portion 484A may comprise a curved portion facing towards front vertical support 318A and partially surround a fuel storage tank. A rear lower curved flange 428A may be coupled to lower rear curved portion 486A. In various embodiments, rear lower curved flange 428A may provide additional strength and/or stiffening to face 422A, and by extension, rear vertical support 320A.

Face 422A may further comprise a first rear flange 424A. In various embodiments, first rear flange 424A is oriented relatively vertically, and may be the rear-most portion of rear vertical support 320A. Further, face 422A may comprise a middle portion 482A. In various embodiments, middle portion 482A of face 422A comprises a rear middle curved portion 490A having a rear middle curved flange 436A. Rear middle curved flange 436A may, for example, at least partially surround a portion of a second fuel storage tank.

In various embodiments, face 422A further comprises a flange 426A positioned along at least a portion of the rear-most edge of upper portion 488A. Face 422A may further comprise one or more upper flanges 432A and/or 430A positioned along at least a portion of forward-facing portion of upper portion 488A.

In various embodiments, face 422A further comprises a coupling flange 438A. Coupling flange 438A may be positioned at substantially the same vertical height as, and have a shape and configuration complementary to, coupling flange 412A of front vertical support 318A.

Face 402A may comprise a plurality of mounting holes, in various positions, configured to couple rear vertical support 320A to first lateral bracket 212A. For example, holes 440A may align with corresponding holes in a portion of first lateral bracket 212A, and holes 442A may align with corresponding holes in a different portion of first lateral bracket 212A. Fasteners may be passed through holes 440A and 442A to couple rear vertical support 320A to first lateral bracket 212A.

Figure 5A:
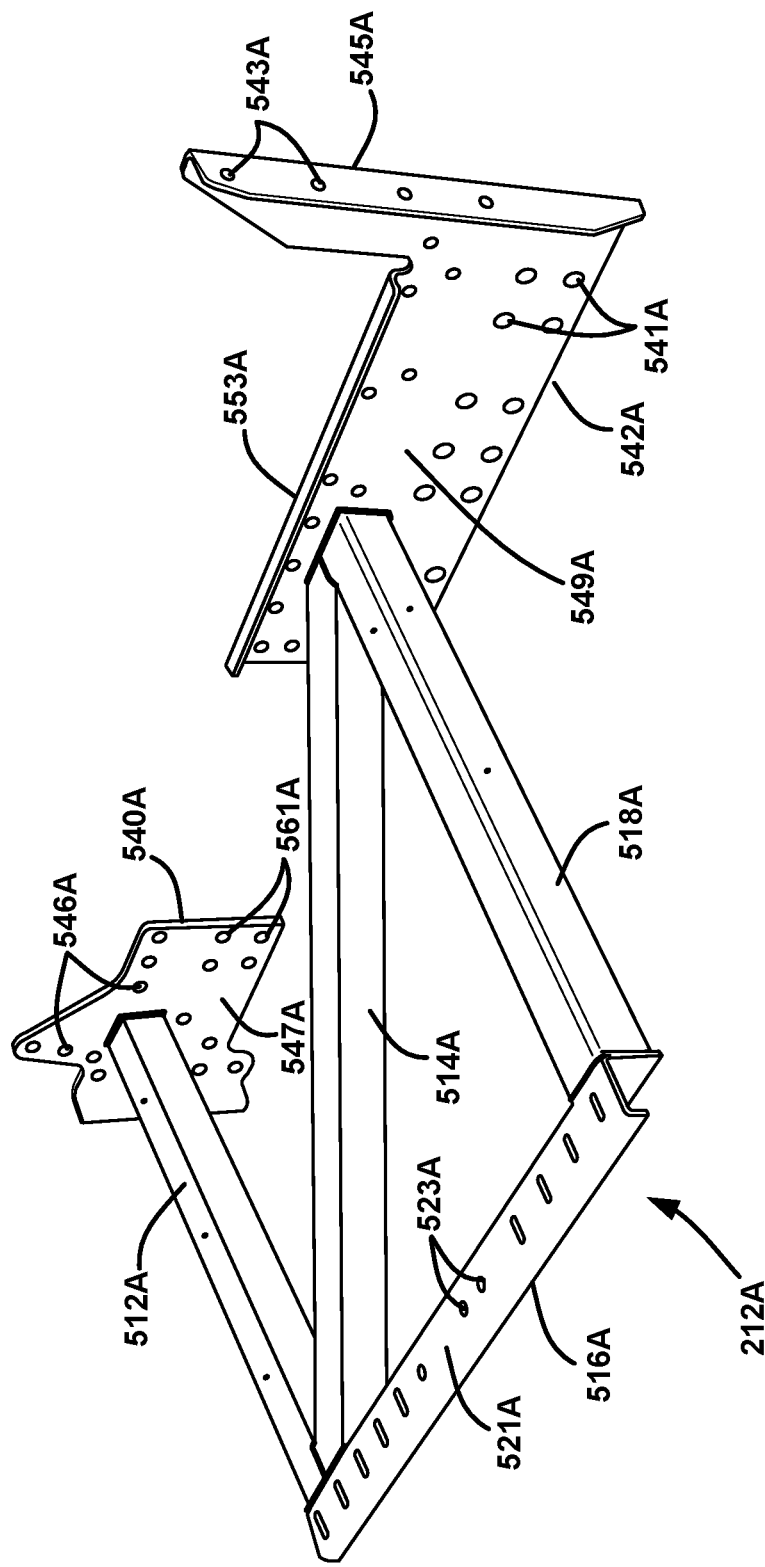
FIG. 5A illustrates a perspective view of a portion of a fuel storage tank mount assembly, in accordance with various embodiments.
Figure 5B:
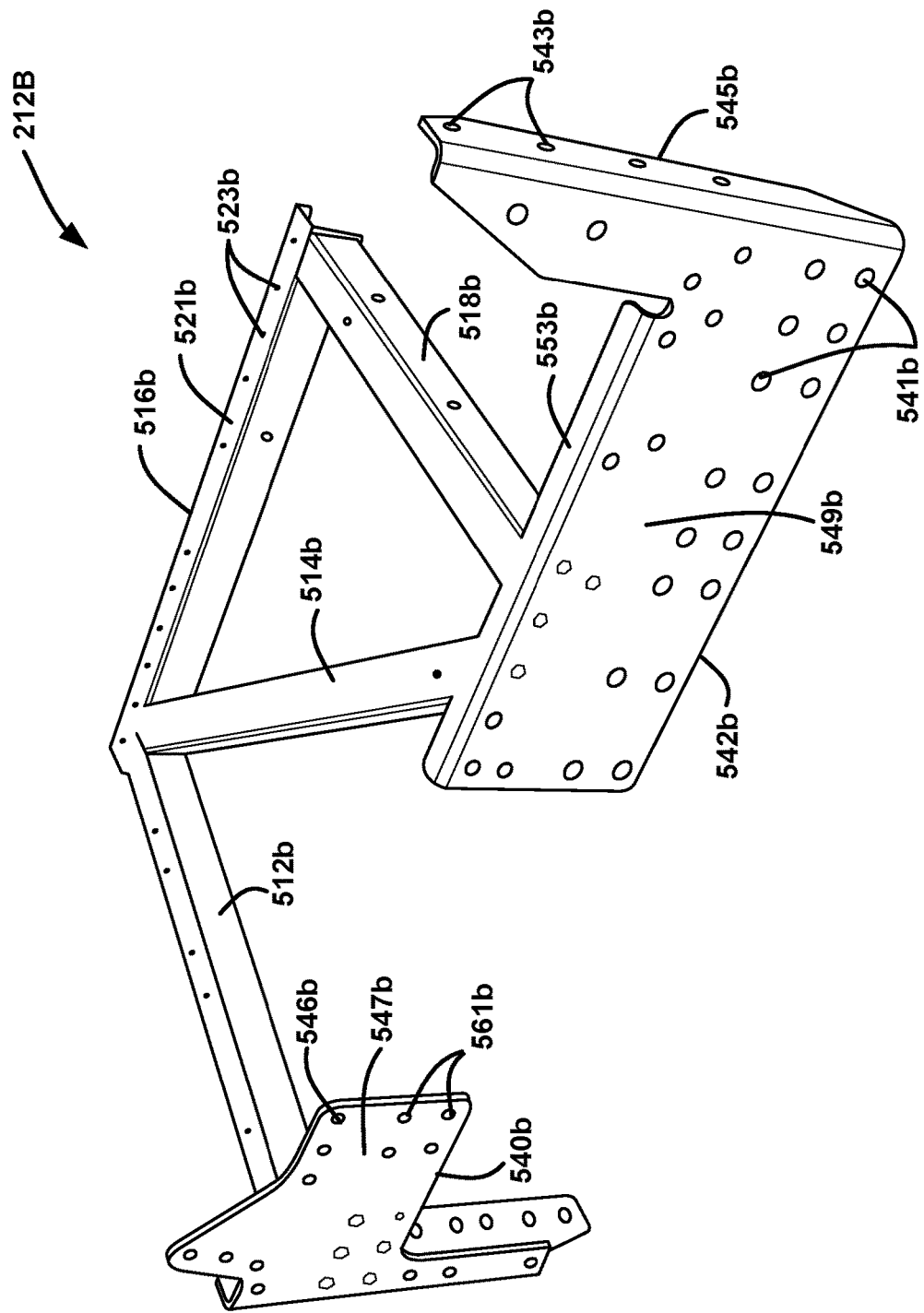
FIG. 5B illustrates a perspective view of another portion of a fuel storage tank mount assembly, in accordance with various embodiments.

With initial reference to FIGS. 5A and 5B, lateral brackets 212A and 212B are illustrated. For the sake of brevity, the following disclosure will be directed to the aspects and elements of the driver side ("A") first lateral bracket 212A. However, the aspects and elements of the passenger side ("B") of second lateral bracket 212B may be similar, identical, or a mirror image of the driver side, and corresponding elements thereof may be labelled accordingly as "A" and "B" in these figures.

First lateral bracket 212A may be coupled to chassis 102 and configured to provide support to fuel storage tank mount assembly 104. For example, force may be applied from fuel storage tank mount assembly 104 in a vertical direction to first lateral bracket 212A, including force resulting from the mass of a portion of fuel storage tank mount assembly 104 and movement of fuel storage tank mount assembly 104 relative to vehicle 100. In various embodiments, first lateral bracket 212A is coupled to first side member 204, and force applied to first lateral bracket 212A is transferred to first side member 204 by compression and expansion of first lateral bracket 212A. Similarly, second lateral bracket 212B may be coupled to second side member 206 and configured to transfer force applied to second lateral bracket 212B to second side member 206.

In various embodiments, first lateral bracket 212A comprises a front mounting bracket 540A. For example, front mounting bracket 540A comprises a face 547A configured to engage with or contact a face of first side member 204. Face 547A may comprise a plurality of holes 561A, through which a fastener can pass to secure a portion of face 547A to first side member 204. However, any manner of coupling and securing face 547A to first side member 204 is within the scope of the present disclosure.

Face 547A may further comprise one or more holes 546A configured to couple face 547A to a component or element of fuel storage tank mount assembly 104. In various embodiments, holes 546A are configured such that a fastener can pass through and couple face 547A to a portion of front vertical support 318A.

First lateral bracket 212A may comprise a front lateral arm 512A coupled to front mounting bracket 540A. For example, front lateral arm 512A may extend substantially perpendicular to face 547A and first side member 204. Front lateral arm 512A may comprise a tube, such as a rectangular or cylindrical tube.

In various embodiments, first lateral bracket 212A further comprises an outer longitudinal arm 516A. For example, outer longitudinal arm 516A may be coupled to an outwardmost portion of front lateral arm 512A. Outer longitudinal arm 516A may be substantially parallel to first side member 204. In various embodiments, a top surface 521A of outer longitudinal arm 516A may engage with and be coupled to a portion of fuel storage tank assembly mount 104 (such as, for example, one or more of outside vertical members 306A and 308A, as illustrated in FIGS. 3A-3F). In various embodiments, outer longitudinal arm 516A comprises a plurality of holes 523A configured such that a fastener can pass through and couple top surface 521A to one or more elements of fuel storage tank mount assembly 104, such as front outside vertical member 306A and/or rear outside vertical member 308A. In various embodiments, outer longitudinal arm 516A may comprise an L channel, a C channel, or any suitable type of tube or tubular member.

In various embodiments, first lateral bracket 212A further comprises a rear mounting bracket 542A. Similar to front mounting bracket 540A, rear mounting bracket 542A may comprise a face 549A. Face 549A may comprise a portion configured to engage with and couple to first side member 204. In various embodiments, face 549A comprises a plurality of holes 541A through which fasteners can be passed to engage and couple face 549A and first side member 204. Rear mounting bracket 542A may comprise a flange 553B configured to engage with and provide support to a portion of fuel storage tank mount assembly 104.

Rear mounting bracket 542A may further comprise a rearward flange 545A. In various embodiments, rearward flange 545A may engage with and secure to rear flange 424A of rear vertical support 320A. Rearward flange 545A may comprise a plurality of holes 543A through which fasteners may couple rear mounting bracket 542A to rear flange 424A of rear vertical support 320A.

First lateral bracket 212A may further comprise a rear lateral arm 518A coupled to rear mounting bracket 542A. For example, similar to front lateral arm 512A, rear lateral arm 518A may extend substantially perpendicular from face 549A of rear mounting bracket 542A. In various embodiments, rear lateral arm 518A is coupled to outside longitudinal arm 516A. Similar to front lateral arm 512A, rear lateral arm 518A may comprise a tubular member, such as a rectangular or cylindrical tube.

In various embodiments, first lateral bracket 212A further comprises a crossmember 514A. In various embodiments, crossmember 514A is coupled to front lateral arm 512A and outside longitudinal arm 516A on one end, and rear lateral arm 518A and face 549A of rear mounting bracket 542A on the other end. In other embodiments, crossmember 514A is coupled to front lateral arm 512A and face 547A of front mounting bracket 540A on one end, and outside longitudinal arm 516A and rear lateral arm 518A on the other end.

Figure 6A:
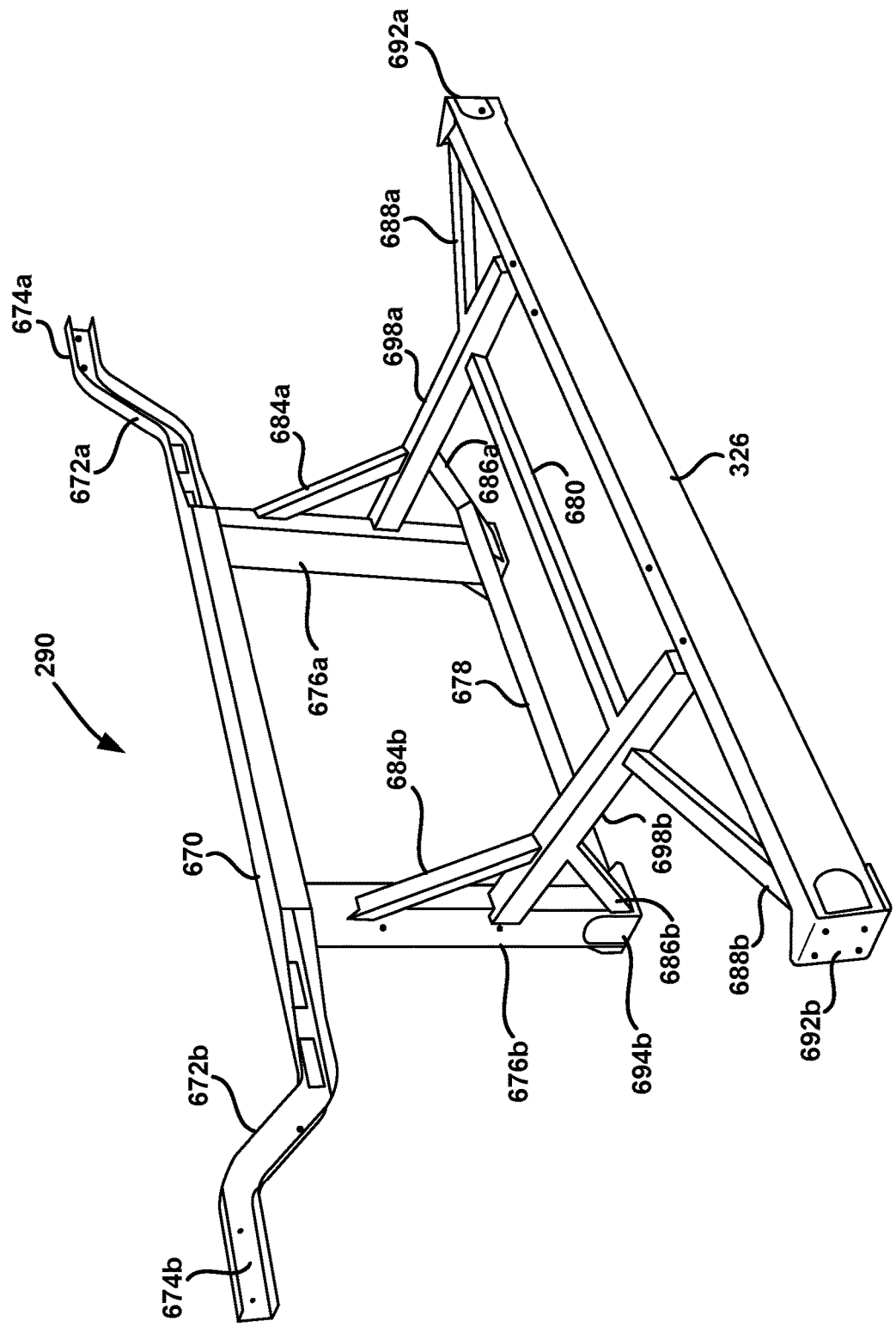
FIG. 6A illustrates a front perspective view of a portion of a vehicle system component mount, in accordance with various embodiments.
Figure 6B:
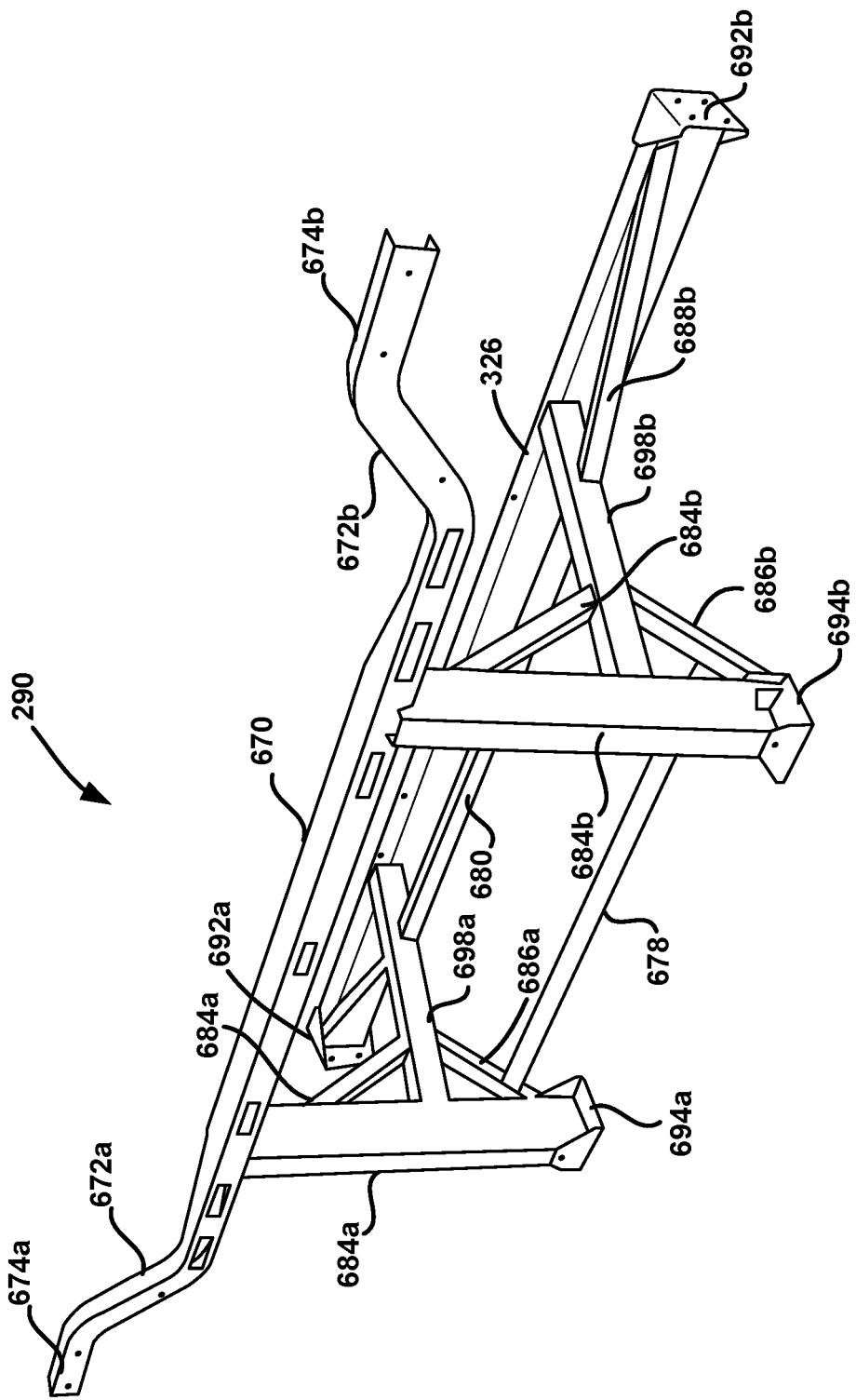
FIG. 6B illustrates a rear perspective view of a portion of a vehicle system component mount, in accordance with various embodiments.

With initial reference to FIGS. 6A and 6B, a subassembly 290 may be coupled to fuel storage tank mount assembly 104. For example, subassembly 290 may secure components or systems of vehicle 100 to fuel storage tank mount assembly 104. In various embodiments, components related to the fuel storage system may be mounted to subassembly 290 in relative proximity to one or more fuel storage tanks. In other embodiments, components of vehicle 100 that may benefit from a relatively high vertical position, such as heat exchangers or air intake plenums, may be coupled to and secured by subassembly 290.

In various embodiments, subassembly 290 may comprise an upper front lateral member 326. With momentary reference to FIGS. 3A and 3C, upper front lateral member 326 may be coupled to one or more of vertical members 306A, 306B, 308A, and 308B. Stated another way, upper front lateral member 326 may be a shared lateral member between subassembly 290 and fuel storage tank mounting assembly 104.

In various embodiments, main bar 670 comprises a substantially symmetrical shape having a first bend 672A proximate one end and a second bend 672B proximate the opposite end. Further, main bar 670 may comprise an elevated end 674A after (i.e., outboard of) first bend 672A and a second elevated end 674B after (i.e., outboard of) second bend 672B. One or more systems or components of vehicle 100 may be coupled to and supported by main bar 670. For example, one or more holes or slots in main bar 670 may be aligned with complementary features in a component of vehicle 100, and a fastener or other securing means may be passed through the holes or slots to couple and secure the component to main bar 670.

Subassembly 290 may further comprise a first vertical support 676A and a second vertical support 676B coupled to main bar 670. For example, first vertical support 676A may be coupled to main bar 670 at a position inboard of first bend 672A, and second vertical support 676B may be coupled to main bar 670 at a position inboard of second bend 672B. In various embodiments, first vertical support 676A comprises a mount 694A at an end opposite of the end coupled to main bar 670. Mount 694A may engage with a component of fuel storage tank mount assembly 104. For example, mount 694A may be coupled to rear vertical support 320A. Similarly, second vertical support 676B may comprise a mount 694B coupled to rear vertical support 320B.

Further, a first longitudinal member 698A and a second longitudinal member 698B may secure vertical supports to one or more components of subassembly 290. In various embodiments, first longitudinal member 698A may be coupled to first vertical support 676A and upper front lateral member 326, and second longitudinal member 698B may be coupled to second vertical support 676B and upper front lateral member 326. In such configurations, longitudinal members 698A and 698B may secure and maintain a desired position and orientation of their respective vertical supports 676A and 676B relative to upper front lateral member 326. For example, first longitudinal member 698A may be coupled to first vertical support 676A at a relative vertical position between main bar 670 and mount 694A. However, any suitable position of first longitudinal member 698A along first vertical support 676A (and similarly, any suitable position of second longitudinal member 698B along second vertical support 676B) is within the scope of the present disclosure.

In various embodiments, one or more diagonal supports may secure and orient vertical supports 676A and/or 676B relative to to lateral members 698A and/or 698B. For example, a first diagonal member 684A and a second diagonal member 686A may be coupled to first vertical support 676A on one end and first longitudinal member 698A on an opposite end. Further, a first diagonal member 684B and a second diagonal member 686B may be coupled to second vertical support 676B on one end and second longitudinal member 698B on an opposite end.

Further, second diagonal member 686A and second diagonal member 686B may be coupled to a lower lateral bar 678. In various embodiments, lower lateral bar 678 may secure and maintain a desired position and orientation of second diagonal member 684A and second diagonal member 686B relative to each other and other components of subassembly 290, such as main bar 670.

In various embodiments, a longitudinal member 680 may be coupled to first longitudinal member 698A and second longitudinal member 698B. For example, longitudinal member 680 may be coupled to first longitudinal member 698A at a position between upper front lateral member 326 and first vertical support 676A and coupled to second longitudinal member 698B at a position between upper front lateral member 326 and second vertical support 676B. In various embodiments, longitudinal member 680 may provide support to and help maintain position and orientation of first longitudinal member 698A and second longitudinal member 698B relative to each other, upper front lateral member 326, and/or other components of subassembly 290.

Upper front lateral member 326 may be further coupled to a first crossmember 688A and a second crossmember 688B. For example, first crossmember 688A may be coupled to upper front lateral member 326 at a position inboard of mount 692A and second crossmember 688B may be coupled to upper front lateral member 326 at a position inboard of mount 692B.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the specification or claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A vehicle chassis, comprising:
a first side member;
a second side member;
an end crossmember coupled to the first side member and the second side member;
an intermediate crossmember coupled to the first side member and the second side member;
a first lateral bracket coupled to the first side member;
a second lateral bracket coupled to the second side member; and
a fuel storage tank mounting assembly comprising:
a first front outside vertical member coupled to a first rear outside vertical member by a first valve-end fuel tank bracket;
a second front outside vertical member coupled to a second rear outside vertical member by a first plug-end fuel tank bracket;
a first front vertical support coupled to a first rear vertical support;
a second front vertical support coupled to a second rear vertical support; and
an upper front lateral member coupled to the first front outside vertical member, the first front vertical support, the second front outside vertical member, and the second front vertical support; and
a subassembly coupled to the first front outside vertical member and the second front outside vertical member,
wherein the subassembly comprises a main bar having a first bend adjacent a first end of the main bar and a second bend adjacent a second end of the main bar,
wherein the first front outside vertical member and the first rear outside vertical member are coupled to an outer longitudinal arm of the first lateral bracket,
wherein the second front outside vertical member and the second rear outside vertical member are coupled to an outer longitudinal arm of the second lateral bracket,
wherein the first front vertical support and the first rear vertical support are positioned adjacent to the first side member, and
wherein the second front vertical support and the second rear vertical support are positioned adjacent to the second side member.

2. The vehicle chassis of claim 1, wherein the subassembly is further coupled to the first front vertical support and the second front vertical support.

3. The vehicle chassis of claim 1, wherein the first front vertical support comprises a lower front curved portion and the first rear vertical support comprises a lower rear curved portion, and wherein the lower front curved portion and the lower rear curved portion are configured to partially surround a fuel tank.

4. The vehicle chassis of claim 1, wherein the first rear vertical support comprises a rear middle curved flange configured to partially surround a fuel tank.

5. The vehicle chassis of claim 1, further comprising:
a second plug-end fuel tank bracket coupled to the first front outside vertical member and the first rear outside vertical member at a vertical position higher than the first valve-end fuel tank bracket; and
a second valve-end fuel tank bracket coupled to the second front outside vertical member and the second rear outside vertical member at a vertical position higher than the first plug-end fuel tank bracket.

6. The vehicle chassis of claim 5, further comprising:
a third valve-end tank bracket coupled to the first front outside vertical member and the first rear outside vertical member at a vertical position higher than the second plug-end fuel tank bracket; and
a third plug-end tank bracket coupled to the second front outside vertical member and the second rear outside vertical member at a vertical position higher than the second valve-end fuel tank bracket.

7. A system for mounting fuel storage tanks to a vehicle, the system comprising:
a first front outside vertical member coupled to a first rear outside vertical member by a first valve-end fuel tank bracket and a first plug-end fuel tank bracket;
a second front outside vertical member coupled to a second rear outside vertical member by a second plug-end fuel tank bracket and a second valve-end fuel tank bracket;
a first front vertical support comprising a first lower front curved portion coupled to a first rear vertical support comprising a first lower rear curved portion, wherein the first lower front curved portion and the first lower rear curved portion are configured to partially surround a fuel tank;
a second front vertical support comprising a second lower front curved portion coupled to a second rear vertical support comprising a second lower rear curved portion, wherein the second lower front curved portion and the second lower rear curved portion are configured to partially surround the fuel tank;
an upper front lateral member coupled to the first front outside vertical member, the first front vertical support, the second front outside vertical member, and the second front vertical support;
a first lateral bracket having a first outer longitudinal arm coupled to the first front outside vertical member and the first rear outside vertical member, a first front mounting bracket, and a first rear mounting bracket;
a second lateral bracket having a second outer longitudinal arm coupled to the second front outside vertical member and the second rear outside vertical member, a second front mounting bracket, and a second rear mounting bracket; and
a subassembly coupled to the first front outside vertical member and the second front outside vertical member,
wherein the upper front lateral member is a part of the subassembly, and
wherein the subassembly comprises a main bar having a first bend adjacent a first end of the main bar and a second bend adjacent a second end of the main bar.

8. The system of claim 7, wherein the first rear vertical support further comprises a rear middle curved flange configured to partially surround the fuel tank.

9. The system of claim 7, wherein the second plug-end fuel tank bracket is coupled to the first front outside vertical member and the first rear outside vertical member at a vertical position higher than the first valve-end fuel tank bracket, and
wherein the second valve-end fuel tank bracket is coupled to the second front outside vertical member and the second rear outside vertical member at a vertical position higher than the first plug-end fuel tank bracket.

10. The system of claim 9, further comprising:
a third valve-end fuel tank bracket coupled to the first front outside vertical member and the first rear outside vertical member at a vertical position higher than the second plug-end fuel tank bracket; and
a third plug-end fuel tank bracket coupled to the second front outside vertical member and the second rear outside vertical member at a vertical position higher than the second valve-end fuel tank bracket.

* * * * *